US006487897B1

United States Patent
Fujii et al.

(10) Patent No.: US 6,487,897 B1
(45) Date of Patent: Dec. 3, 2002

(54) DETECTOR FOR SURFACE TEXTURE MEASURING INSTRUMENT

(75) Inventors: Nobuyoshi Fujii, Kure (JP); Kouichi Imamura, Kure (JP)

(73) Assignee: Mitutoyo Corporation, Kawasaki (JP)

( * ) Notice: Subject to any disclaimer, the term of this patent is extended or adjusted under 35 U.S.C. 154(b) by 30 days.

(21) Appl. No.: 09/695,852

(22) Filed: Oct. 26, 2000

(30) Foreign Application Priority Data

Nov. 1, 1999 (JP) .......................................... 11-310941

(51) Int. Cl.[7] .......................... G01B 5/28; G01B 5/20; G01B 21/30; G01B 21/20
(52) U.S. Cl. ........................................................ 73/105
(58) Field of Search ............................... 73/105; 33/551, 33/553, 556, 558.01, 558.04, 559

(56) References Cited

U.S. PATENT DOCUMENTS 5,726,350 A * 3/1998 Tsuruta ........................ 73/105

FOREIGN PATENT DOCUMENTS

| JP | 5-248815 | 9/1993 | |
| JP | 11-190605 | 7/1999 | .................. 73/105 |
| JP | 11-248404 | 9/1999 | .................. 73/105 |

* cited by examiner

Primary Examiner—Daniel S. Larkin
(74) Attorney, Agent, or Firm—Oliff & Berridge, PLC (57) ABSTRACT

An arm member (52) detachably provided with a stylus arm (53) is rotatably held by a casing (11), where pivots (68) respectively project from both sides of a rotation center of the arm member (52), a first ball bearing (70) engaging with one of the pivots (68) is fixed to the casing (11) and a second ball bearing (70) engaging with the other one of the pivots (68) is fixed to the second ball bearing (70). A leaf-spring (75) has one end fixed to the casing (11) and the other end fixed to the second ball bearing (70). Since the second ball bearing (70) does not shift relative to the leaf-spring (75), measuring pressure remains stable.

1 Claim, 7 Drawing Sheets

DETECTOR FOR SURFACE TEXTURE MEASURING INSTRUMENT

BACKGROUND OF THE INVENTION

1. Field of the Invention

The present invention relates to a surface texture measuring instrument for measuring a surface roughness, waviness, and profile of a workpiece.

2. Description of the Related Art

A surface texture measuring instrument has a detector having a stylus at a distal end thereof, the stylus being moved along a measurement surface to detect displacement of the stylus as a measurement data.

The detector used in the surface texture measuring instrument has an elongated arm member rotatably attached inside an approximately cylindrical casing. A stylus arm having a stylus is provided at the distal end of the arm member. Displacement of the stylus is detected by a detecting unit provided to the arm member.

Conventionally, in order to rotatably support the arm member inside the casing, a pivot has been fixed to a rotation center of the arm member and a bottomed cylindrical bearing for engaging a pointed end of the pivot in a bottom bearing hole is fixed to the casing (Japanese Patent Publication Laid-Open Publication No. Hei 11-248404).

Further, in another conventional arrangement, a spring for pre-loading the arm member is provided in the casing to press the stylus toward the measurement surface (Japanese Patent Publication Laid-Open Publication No. Hei 11-190605).

Since a stylus arm of a different type has to be used in some measurement process, the stylus arm is capable of being plugged in and out of a recess formed at an end of the arm member.

Generally, the surface texture measuring instrument is used for conducting measurement with a skid (referred to "skid measurement" hereinafter) and skidless measurement without using a skid.

Accordingly, the skid is attached to the casing to cover the stylus in the detector of the surface texture measuring instrument. The skid is attached to the casing by a bolt, so that the skid is capable of being attached and detached relative to the detector body.

The skid measurement is used in order to remove a waviness component and to detect only roughness component data when the measurement surface has both waviness and roughness. During the measurement, the detector is moved while both the stylus and the skid are in contact with the measurement surface.

The skidless measurement where the skid is detached from the detector body is used for measuring a cross-sectional profile and straightness of the workpiece by detecting all of the concave-convex data of the measurement surface including waviness, etc. During the skidless measurement, the detector is moved while only the stylus is in contact with the measurement surface.

In the surface texture measuring machine, especially in the surface roughness tester, it has been desired that a workpiece be measured at a minute measuring force of 0.75 mN. However, in the conventional arrangement, the micro measuring pressure has been difficult to achieve on account of measuring orientation in accordance with measuring condition and problems caused in exchanging the stylus arm.

Specifically, though the above conventional art disclosed in Japanese Patent Publication Laid-Open No. Hei 11-248404 can work at the micro measuring pressure, since a force is applied between a pointed end of the pivot fixed to the arm member and the bearing hole of the bearing in plugging the stylus arm in and out, durability of the bearing is inferior. Further, when a great plugging force is applied in exchanging the stylus arm, the bearing cannot sustain the plugging force, and an independent special mechanism is additionally required.

A ball bearing is used for improving durability of the bearing.

For using the ball bearing, in a detector for the surface texture measuring instrument, a pivot may be respectively fixed on both sides of the rotation center of the arm member, and the ball bearing respectively engaging to the pivot may be disposed in the casing.

In order to sufficiently support the pivot by the mutually opposing ball bearings, it is preferable that one of the ball bearings may be fixed to the casing and the other ball bearing may be pressed by one end of a leaf-spring with the other end being fixed to the casing.

However, when the ball bearing is merely pressed by the end of the leaf-spring, the ball bearing abutting the leaf-spring may be shifted by plugging the stylus arm in and out, so that the measuring pressure may be fluctuated in accordance with the position shift of the ball bearing.

Especially, in the detector of the surface texture measuring instrument for measurement with micro measuring pressure, the stylus arm can be fixed and unable to turn on account of the change in the measuring pressure caused in accordance with position shift of the ball bearing.

Further, since the pressing force against the measurement surface of the stylus is determined by the spring force of a spring for pre-loading the arm member in the conventional arrangement of Japanese Patent Publication Laid-Open Publication No. Hei 11-190605, minute change in measuring pressure required for exchanging the stylus arm cannot be sufficiently conducted.

Further, in the conventional arrangements, the skid measurement and the skidless measurement are conducted by attaching and detaching the skid relative to the casing of the detector. However, in both cases, since a straightness correction function has to be switched on and off and a surface roughness calculation and a surface profile calculation have to be switched in accordance with the presence of the skid, troublesome operation has been required and error is likely to occurr.

Further, in order to conduct recalculation after the data outputted by the detector is stored, it has been difficult to identify whether the data was obtained by the skid measurement or the skidless measurement.

SUMMARY OF THE INVENTION

An object of the present invention is to provide a detector for a surface texture measuring instrument capable of highly accurate measurement even with a micro measuring force in accordance with a measuring condition.

A detector for a surface a texture measuring instrument according to the present invention has: an arm member detachably attached with a stylus arm having a stylus at a distal end thereof; and a casing rotatably holding the arm member. The detector being characterized in that pivots project from both sides of a rotation center of the arm member, that a first ball bearing engaged to a distal end of one of the pivots is fixed to the casing, and that a second ball bearing engaged to a distal end of the other one of pivots is attached to the casing through a leaf-spring, the leaf-spring pre-loading the second bearing to the pivot and having one end fixed to the casing and the other end fixed to the ball bearing.

In the present invention, when the detector is moved while the stylus is in contact with the measurement surface, the stylus is displaced along an irregular surface on the measurement surface, the displacement being transmitted as a rotary (seesawing) movement of the stylus arm and the arm member.

Pivots are respectively attached to a rotation a center on both sides of the arm member, the pivots being supported by the ball bearings.

In the present invention, rotary torque can be decreased by using the ball bearing. Further, the stylus can be exchanged by widely supporting the shaft, thus minimizing hysteresis and enabling measurement with a low measuring force.

Since one of the ball bearings is fixed to the leaf-spring and is movable while following the leaf-spring, highly accurate slide movement of the pivot ball bearing is not required, thus reducing production cost.

Even when a force is applied to the bearing in pulling out and inserting the stylus arm, since the ball bearing does not shift relative to the leaf-spring, fluctuation of the rotary torque can be restrained, thus not fluctuating measuring pressure thereafter.

A detector for a surface texture measuring instrument according to the present invention has: an arm member detachably attached with a stylus arm having a stylus at a distal end thereof; and a casing rotatably holding the arm member, the detector being characterized in that a balance weight for balancing weight of the stylus arm and the arm member at a rotation center of the arm member is attached to at least one of the stylus arm and the arm member, the balance weight being movable in an axial direction.

In the present invention, when the stylus arm is exchanged into a different type, the weight center of the arm member and the stylus arm can be shifted. In this case, the measuring pressure can be minutely adjusted by axially sliding the balance weight.

In the above arrangement, the balance weight may preferably have a weight body disposed on an end of the arm member and a screw portion having a base end fixed to the weight body and being screwed to a female screw extending in the longitudinal direction of the arm member.

According to the above arrangement, since the balance weight includes the weight body and the screw portion, the balance weight can be easily slid by rotating the weight body to adjust screwing amount of the screw portion.

A detector for a surface texture measuring instrument according to the present invention has: an arm member detachably attached with a stylus arm having a stylus at a distal end thereof; a casing rotatably holding the arm member; and a skid detachably attached to the casing with a distal end disposed around the stylus, the detector being characterized in having a detecting switch for detecting whether the skid is attached to the casing or not.

In the present invention, whether the skid is attached or not can be detected by the detecting switch, so that switching on and off the straightness correction function and switching between a surface roughness calculation and a surface profile calculation are automatically possible, thereby facilitating operation thereof and avoiding error.

Further, when the data outputted by the detector is stored, the output signal outputted by the detecting switch is also stored, so that it can be facilitated to identify whether certain data is collected by the skid measurement or the skidless measurement. And switching on and off the straightness correction function and switching between the surface roughness calculation and the surface profile calculation are automatically possible during re-calculation, thereby facilitating operation thereof and avoiding error.

An example of the detecting switch is a limit switch, a pressure-sensitivity switch using a piezoelectric device.

When the limit switch is used as the detecting switch, the structure of the detecting switch can be simplified.

DETAILED DESCRIPTION OF PREFERRED EMBODIMENT(S)

An embodiment of the present invention will be described below with reference to attached drawings.

Figure 1:
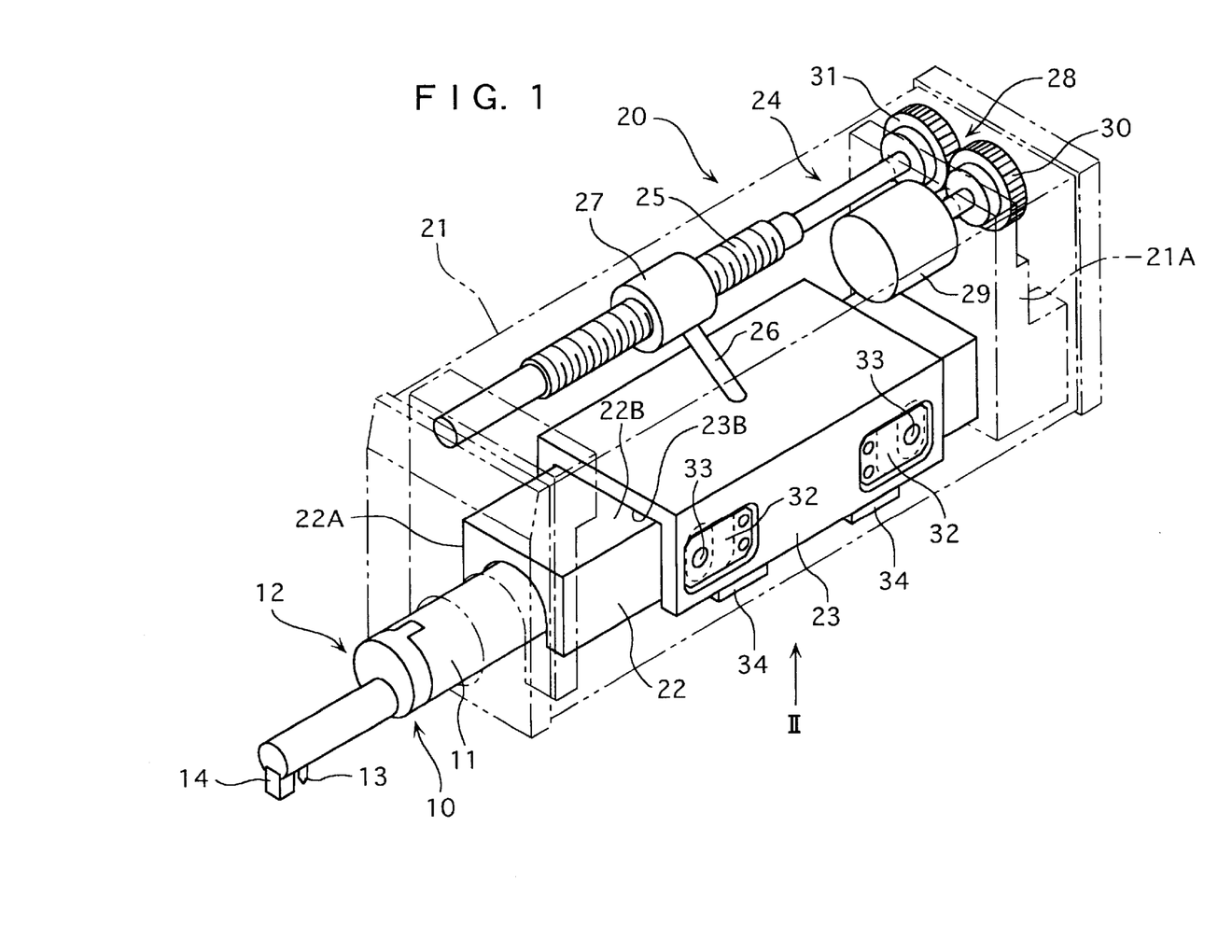
FIG. 1 is a perspective view showing summarized arrangement of a surface texture measuring instrument applied with an embodiment of the present invention.

FIG. 1 is a summarized perspective view showing a surface texture measuring instrument embodying a detector according to an embodiment of the present invention.

In FIG. 1, the surface texture measuring instrument according to the present embodiment has a detector 10 for measuring a texture of a measurement surface of a workpiece and a drive unit 20 for advancing and retracting the detector 10 along the measurement surface.

The drive unit 20 has a slider guide 22 having approximate bridge-type cross section fixed along longitudinal direction of a box-shaped casing 21, a slider 23 provided on the slider guide 22 slidable along the longitudinal direction and having the detector 10, and an advance-retraction mechanism 24 for advancing and retracting the slider 23 along the longitudinal direction.

The advance-retraction mechanism 24 has a feeding threaded shaft 25 disposed in the casing 21, a nut 27 screwed to the lead screw 25 and connected to the slider 23 through a joint 26, and a rotary drive mechanism 28 for rotating the lead screw 25.

The lead screw 25 is disposed in parallel to the longitudinal direction of the slider guide 22 and both ends of the lead screw 25 are rotatably fixed to the casing 21 through a bearing.

The rotary drive mechanism 28 has a motor 29 disposed in parallel with the lead screw 25, and first and second gear wheels 30 and 31 for transmitting normal and reverse rotation of the motor to the lead screw 25. The lead screw 25 and the motor 29 are attached to a mounting block 21A provided inside the casing 21.

An inner side of the slider 23 is formed in a C-shape a cross section and one of the mutually opposing inner sides is arranged as first reference surface. The first reference surface is abutted to an outer side (first reference surface 22A) of the slider guide 22.

For determining position of the slider 23 and the slider guide 22 by the reference surfaces, two positioning leaf-springs 32 are attached to one side of the slider 23. A pad 33 for securing smooth sliding movement of the slider 23 relative to the slider guide 22 is attached to an opening end of the positioning leaf-spring 32. The pad 33 is formed by a material having low friction coefficient, such as TEFLON (trade name).

The slider 23 has a second reference surface 23B orthogonal with the first reference surface in the C-shaped inner sides, the second reference surface 23B being abutted to an outer side (second reference surface 22B) orthogonal with the first reference surface 22A of the slider guide 22.

Figure 2:
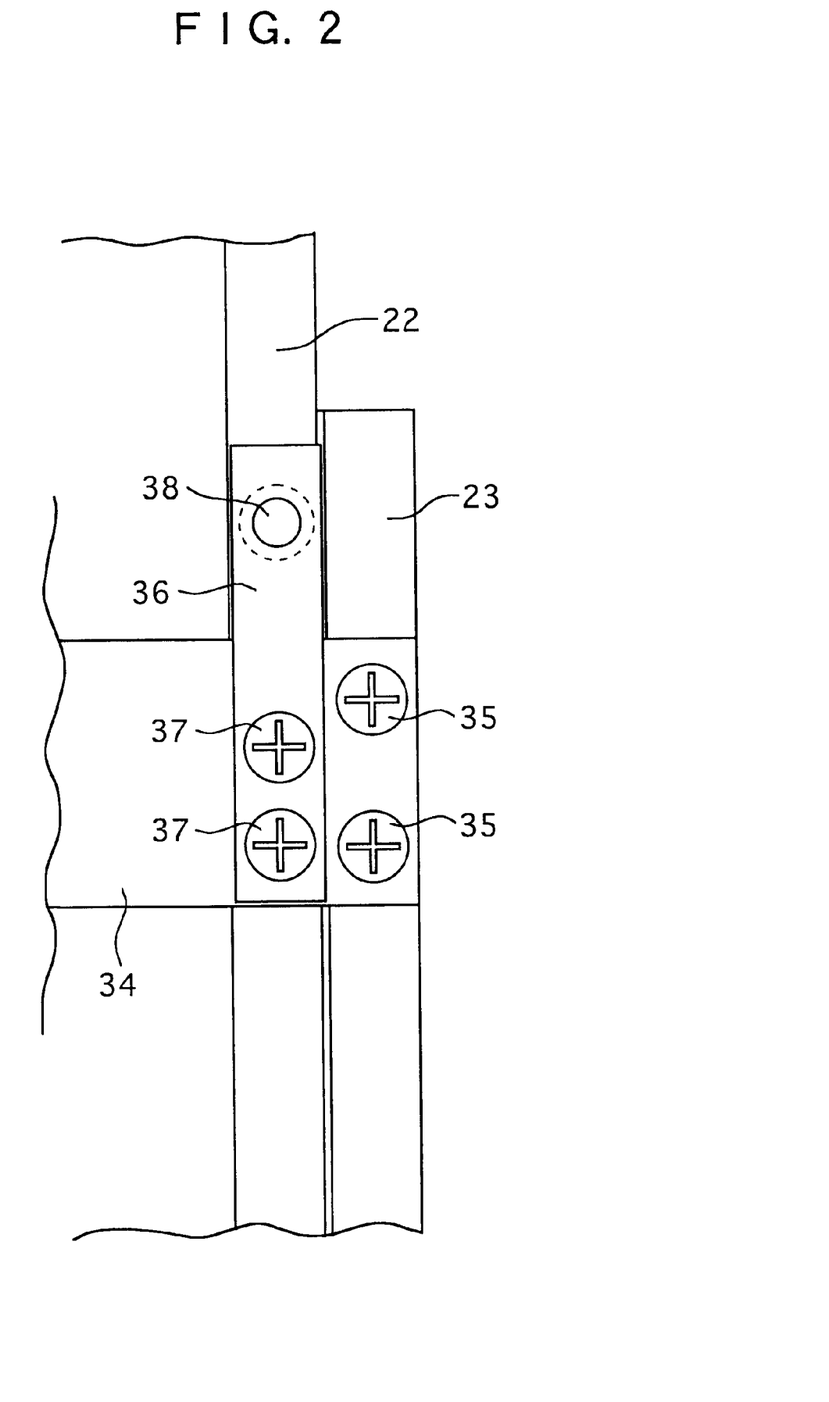
FIG. 2 is a view seen from a direction arrowed by II in FIG. 1.

In FIG. 2, a retainer block 34 for preventing detachment of the slider is attached on an opening end of the slider 23 (only one side is shown in FIG. 2) by screws 35, the retainer block 34 having a positioning leaf-spring attached by screws 37 for bringing the second reference surface of the slider 23 into contact with the second reference surface of the slider guide 22. A pad 38 for securing smooth sliding movement of the slider 23 and the slider guide 22 is attached to the positioning leaf-spring 36. The pad 38 is formed by a material having a low friction coefficient, such as TEFLON (trade name).

Figure 3:
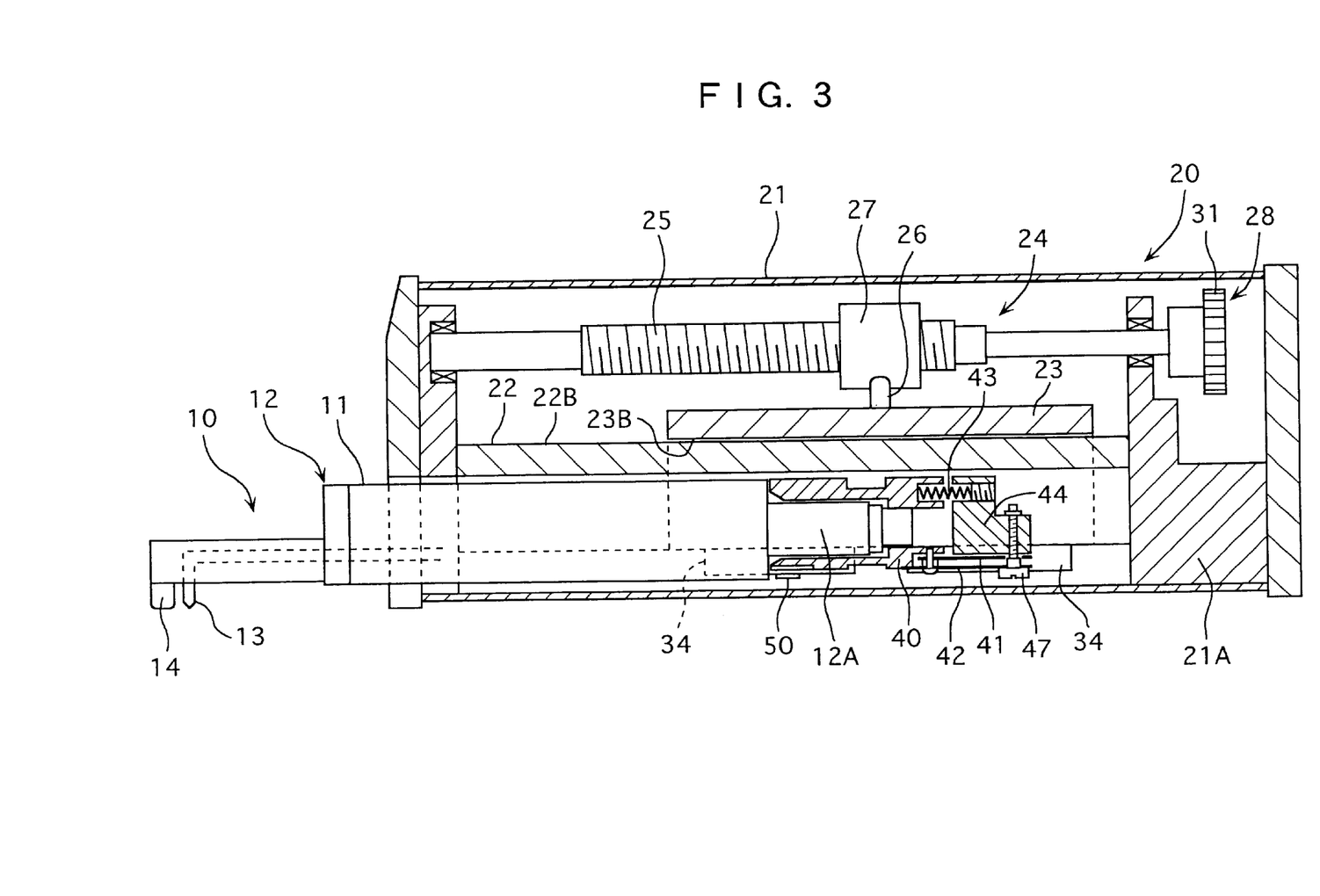
FIG. 3 is a cross section of the aforesaid embodiment.

A joint mechanism of the detector 10 and the drive unit 20 is shown in FIG. 3.

In FIG. 3, the detector 10 is accommodated in an opening of the slider guide 22 along a longitudinal direction, an end of the detector 10 being exposed from an end surface of the drive unit 20.

The detector 10 has a detector body 12 having an approximately cylindrical casing 11, and the stylus 13 for measuring surface texture is supported inside the detector body 12 in a seesawing manner. A skid 14 covering a periphery of a distal end of the stylus 13 is attached to the casing 11.

The detector body 12 includes an approximately cylindrical connector 12A provided at a base end of the detector body 12, and a connector attachment 40 detachably attached to the connector 12A.

The connector attachment 40 is connected to a drive unit attachment 44 through first leaf-spring 41, second leaf-spring 42, and a helical spring 43, and the drive unit attachment 44 being attached to the retainer block 34. The drive unit attachment 44 and the retainer block 34 are also included in the drive unit 20.

The connector attachment 40 and the detector 10 are rotatable around the drive unit attachment 44 and a revolving range of the connector attachment 40 and the detector 10 is restricted by a stopper 50 attached to the retainer block 34.

Figure 4:
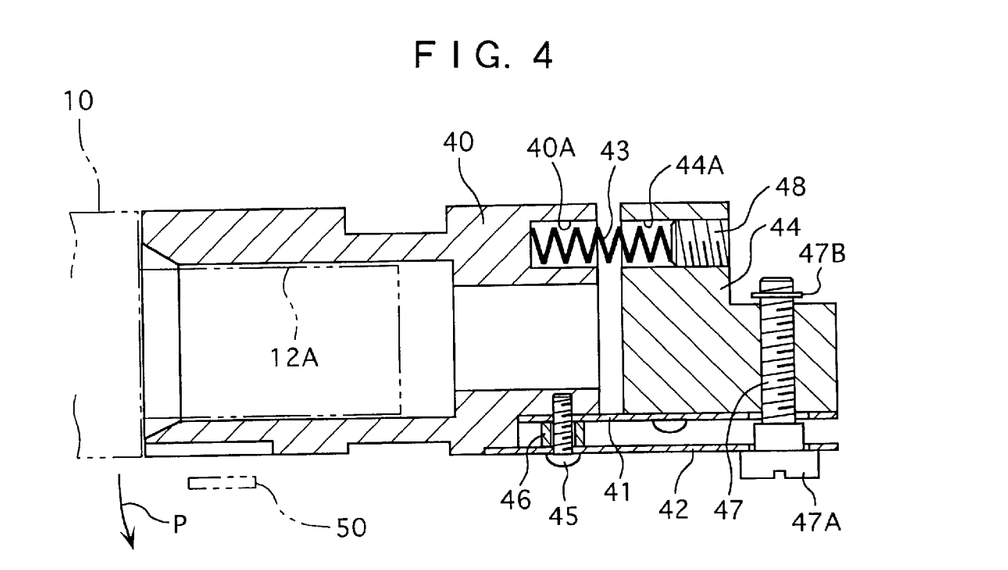
FIG. 4 is a cross section showing a primary portion of the aforesaid embodiment.
Figure 5:
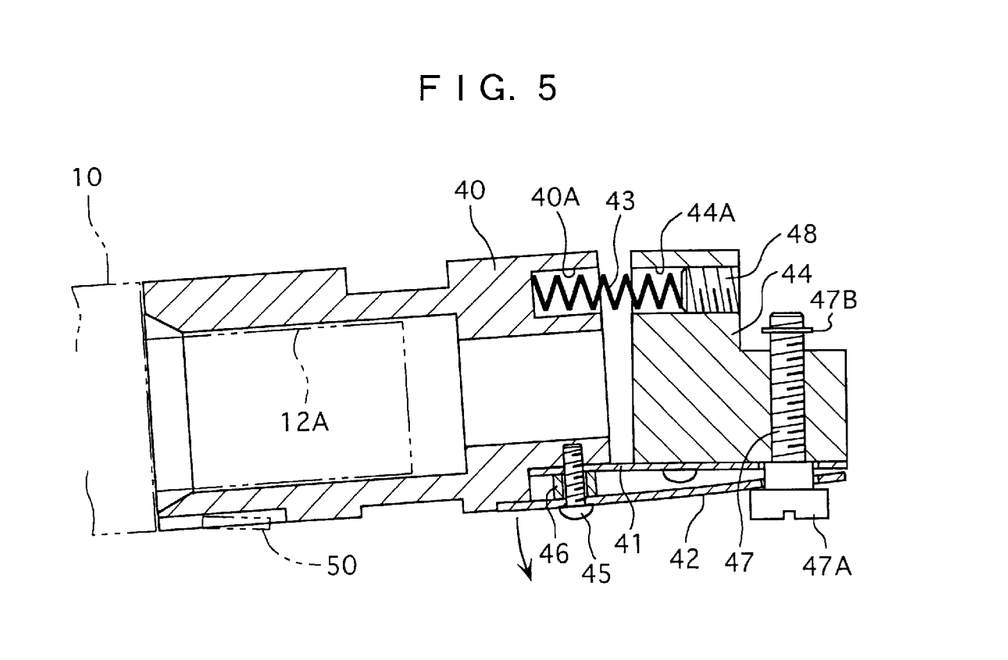
FIG. 5 is a cross section similar to FIG. 4 showing a condition for skidless measurement.

A connecting mechanism of the connector attachment and the drive unit attachment 44 is zoomed in FIGS. 4 and 5.

In FIG. 4, the first leaf-spring 41 and the second leaf-spring 42 rotatably bias the skid 14 in a direction P to press the skid 14 toward the measurement surface.

Among the leaf-springs, the first leaf-spring 41 has a first end on a side of the detector being fixed to the connector attachment 40 and the second end being fixed to the drive unit attachment 44, the first leaf-spring mainly functioning as a holding pre-loading means for holding the detector 10.

The second leaf-spring 42 is disposed in parallel with the first leaf-spring 41 spaced apart at a predetermined interval, the first end of the second leaf-spring 42 being attached to the connector attachment 40 by an attachment screw 45. A spacer 46 is interposed between the first ends of the first and the second leaf-springs 41 and 42, so that the first ends are mutually spaced apart at a predetermined interval.

The second leaf-spring 42 functions as a pressing pre-loading means for pressing the detector 10 toward the measurement surface. When the other end (second end) of the second leaf-spring 42 comes adjacent to the second end of the first leaf-spring 41, a spring force is generated on the first end of the second leaf-spring 42, thus increasing the force for pre-loading the detector 10.

An adjustment screw 47 attached to the drive unit attachment 44 as a pre-loading force controller is provided on the second end of the second leaf-spring 42.

The adjustment screw 47 sandwiches the second ends of the first leaf-spring 41 and the second leaf-spring 42 between a head 47A thereof and the drive unit attachment 44. The second end of the second leaf-spring 42 and the second end of the first leaf-spring 41 approach and separate by adjusting the screwing amount of the adjustment screw 47.

When the adjustment screw 47 is screwed at the maximum, the second end of the second leaf-spring is the most adjacent (abutted) to the second end of the first leaf-spring 41, thus applying a predetermined pre-loading force to the detector 10. Then, the detector 10 turns toward the direction P, which is restricted by the stopper 50 (see FIG. 5). Here, the stopper 50 works as a restriction means for restricting the movement of the detector 10 in the pre-loading direction (rotation in the direction P) for skidless measurement.

A ring 47B for preventing detachment of the adjustment screw 47 is provided at a distal end of a threaded portion of the adjustment screw 47.

The helical spring 43 is a compression spring having a first end being engaged in a recess 40A of the connector attachment 40 and the second end being engaged in a hole 44A of the drive unit attachment 44. The spring 43 works as an auxiliary pre-loading means for pre-loading the connector attachment 40 in a direction away from the drive unit attachment 44 (a direction for turning the detector 10 in the direction P).

A spring force adjustment screw 48 is screwed to the hole 44A of the drive unit attachment 44, and the head of the spring force adjustment screw 48 is abutted to the second end of the helical spring 43. By adjusting the screwing amount of the spring force adjustment screw 48, the length of the helical spring 43 is changed, thus adjusting the pre-loading force.

Figure 6:
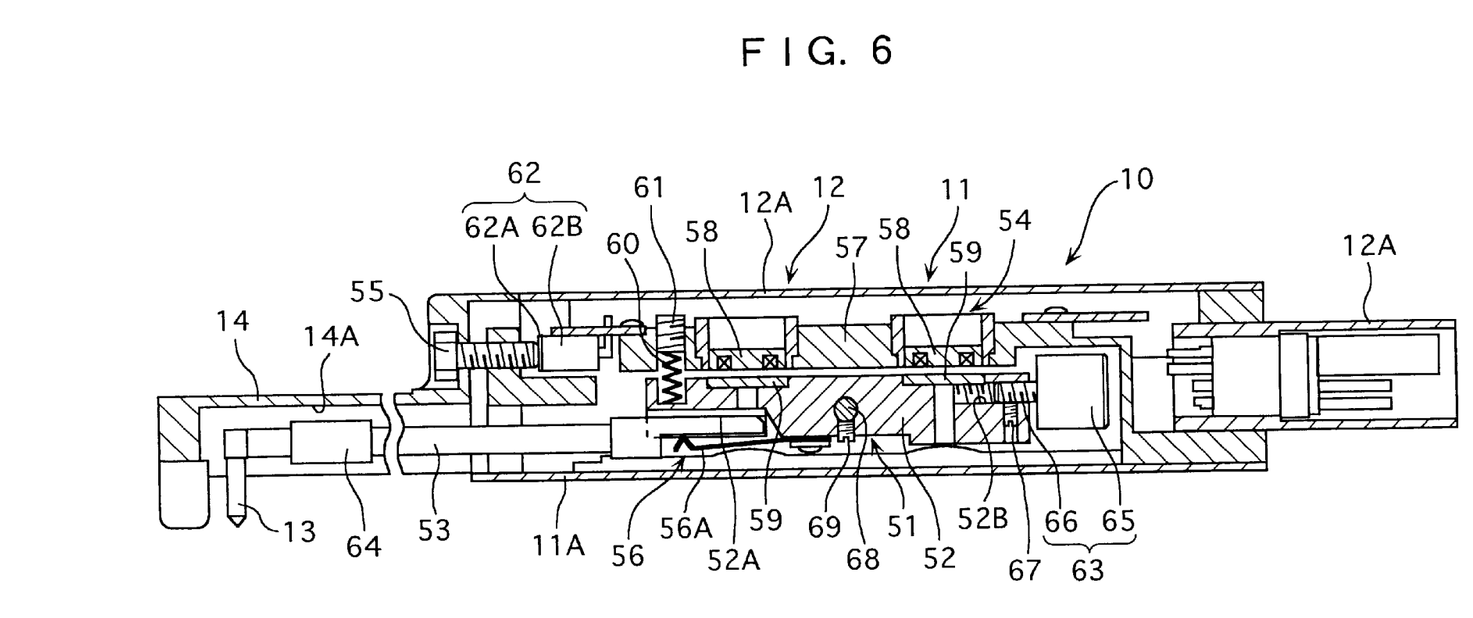
FIG. 6 is a cross section of the aforesaid embodiment.
Figure 7:
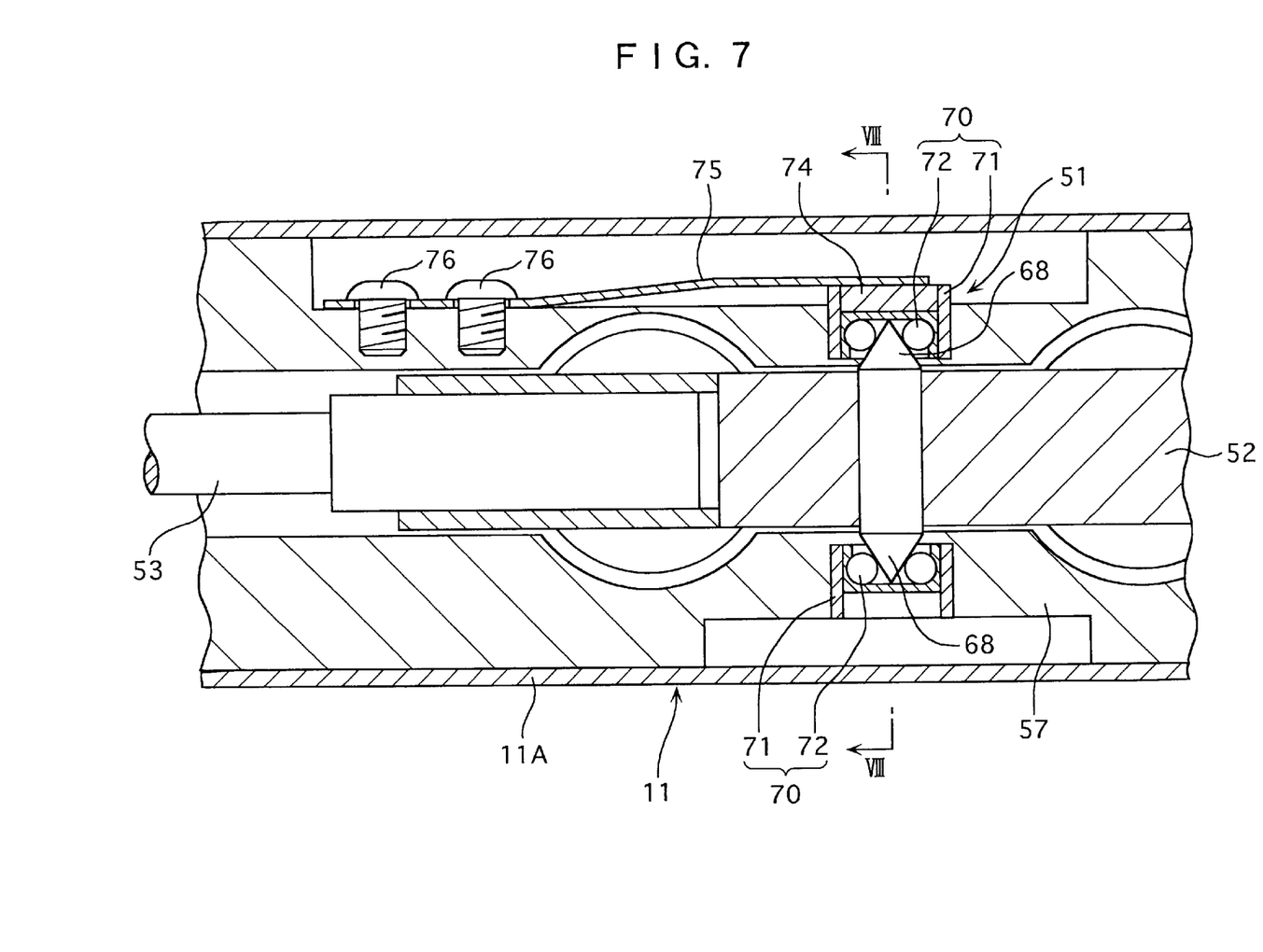
FIG. 7 is a cross section showing a primary portion of the aforesaid embodiment.
Figure 8:
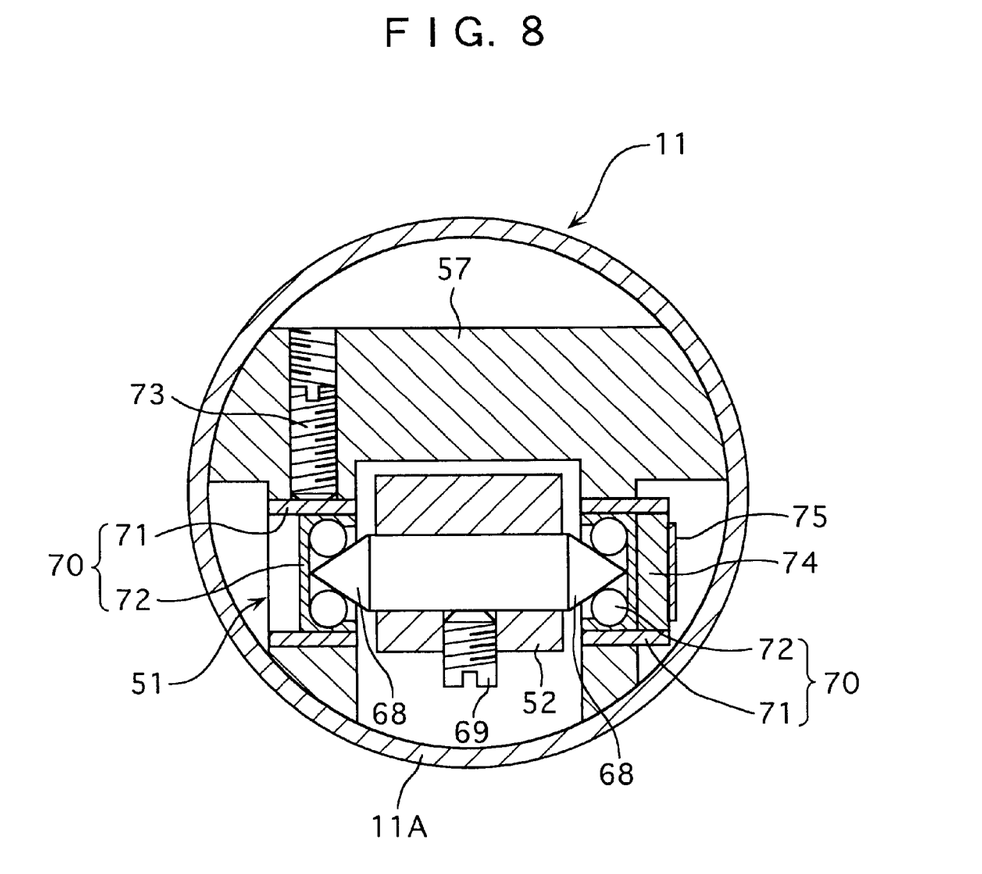
FIG. 8 is a cross section taken along VIII—VIII line in FIG. 7.

An internal structure of the detector 10 of the present embodiment is shown in FIGS. 6 to 8.

As shown in FIG. 6, showing an entire arrangement, the detector body 12 has an approximately square-pillar arm member 52 supported in the casing 11 in a revolving (seesawing) manner through a bearing 51, a stylus arm 53 having the stylus 13 at a distal end thereof and being detachably provided to the arm member 52, and a detecting unit 54 provided in the casing 11 for detecting vertical movement of the stylus 13.

The skid 14 is detachably attached to a distal end of the casing 11 by a bolt 55. A distal end of the skid 14 covers the stylus 13 and has a recess 14A for accommodating the stylus arm 53, the recess 14A extending from a central portion to a base end of the skid 14.

The stylus arm 53 has the stylus 13 at an approximately shaft-shaped distal end thereof, a base end of the stylus arm 13 being attached to the arm member 52 by a stylus attachment 56. The stylus arm 53 is attached to the arm member 52 along longitudinal direction thereof.

The stylus attachment 56 includes a spring member 56A for sandwiching the base end of the stylus arm 53 with the recess 52A formed at the distal end of the arm member 52, the stylus arm 53 being capable of plugging in and out of the arm member 52.

The casing 11 has a cylindrical member 12A and a mounting block 57 provided in the cylindrical member 12A, the cylindrical member 12A being detachable relative to the mounting block 57.

The detecting unit 54 is composed of the mounting block 57, two detecting coils 58 buried in the mounting block 57 spaced apart with each other by a predetermined distance, and two core lids 59 buried in the arm member 52 respectively corresponding to the detecting coils 58. The detecting unit 54 detects a displacement of the arm member 52 in accordance with advancement and retraction of the stylus 13 as a displacement of the stylus 13.

A helical spring 60 for constantly pre-loading the stylus 13 onto the measurement surface is interposed between the distal end of the arm member 52 and the mounting block 57. A tip end of the stylus 13 constantly projects from the distal end of the skid 14.

A spring force adjustment screw 61 is abutted to one end of the helical spring 60, and the spring force adjustment screw 61 is screwed to the attachment block 57. The length of the helical spring 60 is changed by adjusting the screwing amount of the spring force adjustment screw 61, so that adjusting the pre-loading force is adjusted.

A limit switch 62 is attached to a portion opposing the skid 14.

The limit switch 62 detects whether the skid 14 is attached to the casing 12 or not through the bolt 55. The limit switch includes a detecting plate 62A to be in contact with a distal end of the bolt 55, and a switch body 62B for detecting that the bolt 55 presses the detecting plate 62A.

The switch body 62B is connected to a data processing circuit (not shown). When the distal end of the bolt 55 touches the detecting plate 62A, a signal for canceling a straightness correction function of the drive unit is transmitted to the data processing circuit for conducting a skid measurement. When the distal end of the bolt 55 does not touch the detecting plate 62A, a signal for effecting the straightness correction function of the drive unit 20 is sent to the data processing circuit for conducting a skidless measurement. Incidentally, FIG. 6 shows the skid 14 being attached to the casing 11 by the bolt 55, where the detecting plate 62A is in contact with the switch body 62B.

First balance weight 63 is provided at a base end of the arm member 52 and second balance weight 64 is provided on the stylus arm 53.

The balance weights 63 and 64 balances the weight of the stylus arm 53 and the arm member 52 around the bearing 51.

The first balance weight 63 is composed of an approximately cylindrical weight body 65 disposed in a space between the base end of the arm member 52 and the attachment block 57 and a screw 66 coaxially fixed to a shaft center of an end of the weight body 65, the screw 66 being screwed to a female screw 52B extending in the longitudinal direction of the arm member 52. The first balance weight 65 is movable along the axis direction by adjusting the screwing amount thereof.

A positioning screw 67 for axially positioning the first balance weight 63 is attached to the arm member 52. The positioning screw 67 extends orthogonally with the female screw 52B.

The second balance weight 64 is a cylindrical member movable along the axial direction with an inner circumference thereof being engaged on the stylus arm 53.

A detailed structure of the bearing 51 is shown in FIGS. 7 and 8.

In the figures, pivots 68 projects from both sides of the arm member 52, respectively. As illustrated, the pivots 68 are formed of one cylindrical member having a conic portion on both ends thereof and penetrating the arm member 52, where rotation of the pivots 68 is restricted by a rotation setscrew 69. However, the pivots may be constructed by fixing two pivots on both sides of the arm member 52 by an adhesive or the like.

Ball bearings 70 are respectively engaged to the distal ends of the pivots 68. The ball bearing 70 has a cylindrical casing 71 and a bearing mechanism 72 having a plurality of balls. Among the ball bearings, one of the ball bearings 70 is fixed to the mounting block 57 by a setscrew 73 and the other ball bearing 70 is provided on the mounting block 57 slidably in an axial direction of the other ball bearing 70.

The other ball bearing 70 is provided with a cap 74 on an end opposite to the pivots 68. An end of a leaf-spring 75 for pre-loading the ball bearing 70 toward the pivots 68 is fixed to the cap 74 by an adhesive or the like.

The other end of the leaf-spring is fixed to the mounting block 57 by two screws 76.

A function of the above arrangement of the present embodiment will be described below.

For conducting skidless measurement, the skid 14 is initially detached from the casing 12. Accordingly, the distal end of the bolt 55 is not in contact with the detecting plate 62 A, so that a signal indicating skidless measurement is outputted by the limit switch 62, thus switching on the straightness correction function of the drive unit 20 by the data processing circuit (not shown) and switching data processing to surface profile calculation, not surface roughness calculation. When the data outputted by the detector 10 is stored, the signal indicating skidless measurement is also stored simultaneously.

Subsequently, a predetermined pre-loading force is applied to the detector by the adjustment screw 47.

When the adjustment screw 47 is screwed at the maximum, the second end of the second leaf-spring 42 becomes the most adjacent to the second end of the first leaf-spring 41, thus pre-loading the first end of the second leaf-spring 42 away from the first end of the first leaf-spring 41.

Though the connector attachment 40 and the detector 10 are turned in the direction P with a predetermined pre-loading force, the connector attachment 40 is abutted to the stopper 50 provided on the pre-loading block 34, thus stopping movement of the detector 10 in the direction P. At this time, since the connector attachment 40 and the detector 10 are biased by the first and the second leaf-springs 41 and 42 and the helical spring 43, the connector attachment 40 and the detector 10 do not turn to a direction opposite to the direction P.

Under the above condition, the measurement surface is measured by the detector 10.

The surface texture measuring instrument is set on the workpiece, and the drive unit 20 is operated to move the detector 10 while the distal end of the stylus 13 is in contact with the measurement surface.

In operating the drive unit 20, the motor 29 is actuated and the rotation of the motor 29 is transmitted to the lead screw 25 through the first and the second gear wheels 30 and 31. When the lead screw 25 is rotated, the nut 27 moves along an axis line of the lead screw 25 and the slider 23 moves on the slider guide 22 in accordance with the movement of the nut 27.

The detector 10 attached to the slider 23 through the drive unit attachment 44 and the connector attachment 40 moves in accordance with the movement of the slider 23.

At this time, the stylus 13 of the detector 10 displaces in accordance with irregularity on the measurement surface of the workpiece, and the displacement is transmitted as a rotary movement of the stylus arm 53 and the arm member 52.

The rotary movement of the arm member 52 is detected by the detecting unit 54 and is sent to the data processing circuit as the displacement of the stylus 13. The data processing circuit switches on the straightness correction function of the drive unit 20, and switches data processing to the surface profile calculation instead of the surface roughness calculation. Further, when the data outputted by the detector 10 is stored, the signal indicating the skidless measurement is also stored.

In the arm member 52, since the pivots 68 provided to the rotation center on both sides of the arm member 52 is smoothly supported by the ball bearings, rotary torque can be reduced.

On the other hand, for conducting a skid measurement, the skid 14 is attached to the casing by the bolt 55. Accordingly, since the distal end of the bolt 55 touches the detecting plate 62A, a signal indicating skid measurement is outputted by the limit switch 62, so that the straightness correction function of the drive unit 20 is set "off" in the data processing circuit (not shown) and data processing is changed into a surface roughness calculation instead of a surface texture measurement. Further, the signal indicating skid measurement is also stored in storing the data outputted by the detector 10.

Subsequently, the screwing amount of the adjustment screw member 47 is loosened, thus applying less than the predetermined value of the pre-loading force to the detector 10.

Then, though the skid 14 is biased by the pre-loading force generated to the detector 10, the movement of the detector 10 in the pre-loading direction is not restricted by the stopper 50.

In the above condition, the surface texture measuring instrument is set on the workpiece and the drive unit 20 is operated to move the detector 10 while the distal end of the stylus 13 and the skid 14 are in contact with the measurement surface.

The skid 14 is displaced along the waviness of the measurement surface and the displacement is transmitted as a seesawing movement of the stylus arm 53 and the arm member 52.

The seesawing movement of the arm member 52 is detected by the detecting unit 54 and is transmitted to the data processing circuit as a relative displacement of the stylus 13 against the skid 14. Since the straightness correction function of the drive unit 20 is set "off" in the data processing circuit, the displacement of the stylus 13 relative to the skid 14 is detected as data, such as surface roughness.

When the stylus arm 53 needs to be exchanged into a different type, the stylus arm 53 is pulled out of the arm member 52 and a new stylus arm 53 is inserted into the stylus attachment 56 of the arm member 52.

Even when a force is applied to the bearing 51 in pulling out and inserting the stylus arm 53, since the ball bearing 70 is fixed to the leaf-spring 75, the ball bearing does not shift relative to the leaf-spring 75, thus not fluctuating the measuring pressure thereafter.

Further, after the new stylus arm 53 is attached, the weight is balanced by the balance weight 64. Ordinarily, the first balance weight 63 is adjusted and fixed in advance so that the weight is balanced when a reference stylus arm is attached. When an ordinary stylus arm is attached, the balance is adjusted only by the second balance weight 64. On the other hand, when a special, especially a light-weight, stylus arm needs to be attached, the weight is necessary to be balanced by the first balance weight 63. In this case, the cylindrical member 12A is detached from the mounting block 57.

According to the present embodiment, the following effects can be obtained.

In the present embodiment, the arm member 52 having the stylus arm 53 detachably attached thereto is rotatably supported by the casing 11 and the pivots 68 are attached to both sides of the rotation center of the arm member 52, the pivots 68 engage the ball bearings 70. Accordingly, rotary torque of the bearing portion can be reduced by using the pivots bearing. Further, the stylus can be exchanged by widely supporting the shaft, thus minimizing hysteresis and enabling measurement with a low measuring force.

Further, the ball bearing 70 engaging the distal end of the pivots 68 is fixed to the casing 11 and the other ball bearing 70 engaging to the distal end of the pivots 68 is attached to the casing 11 through the leaf-spring 75, the leaf-spring 75 being biased toward the pivots 68 and having one end fixed to the casing 11 and the other end fixed to the ball bearing 70. Accordingly, since the ball bearing 70 fixed to the leaf-spring 75 is movable while following the leaf-spring 75, highly accurate slide movement of the pivots ball bearing is not required, thus reducing production cost.

Further, since the ball bearing 70 does not shift relative to the leaf-spring 75 even when the stylus arm 53 is inserted into and pulled out of the arm member 52 while applying force toward the bearing portion, the measuring force does not fluctuate.

Further, since the balance weights 63 and 64 for balancing the weight of the stylus arm 53 and the arm member 52 by the bearing 51 are provided, even when the weight center of the arm member 52 and the stylus arm 53 is shifted in exchanging the stylus arm 53 into a different type, the measuring pressure can be minutely adjusted by axially sliding the balance weights 63 and 64.

Accordingly, a highly accurate measurement is possible in the present embodiment.

Further, since two types of balance weights, i.e. the first balance weight 63 and the second balance weight 64 are provided, the measuring pressure can be easily and minutely adjusted by adjusting the balance weights 63 and 64.

Since the first balance weight 63 is composed of the weight body 65 disposed on an end side of the arm member 52 and a screw 66 having a base end fixed to the weight body 65 and being screwed to the female screw 52B extending in longitudinal direction of the arm member 52, the first balance weight 65 can be easily slid by adjusting a screwing amount of the screw 66 by rotating the weight body 65.

Further, since the positioning screw 67 for positioning the first balance weight 63 in the axial direction is attached to the arm member 52, the first balance weight 63 does not erroneously move after being positioned, thus securing micro measuring pressure and enabling highly accurate measurement.

Since the second balance weight 64 is composed of a cylindrical member having an inner circumference engaged to the stylus arm 53 and movable in the axial direction, the structure of the second balance weight 64 can be simplified and the second balance weight 64 can be easily operated without detaching the cylindrical member 11A of the casing 11.

Further, in the present embodiment, the detecting switch 62 for detecting whether the skid 14 is attached to the casing 11 or not is provided. Accordingly, when the detecting switch 62 confirms that the skid 14 is not attached, the straightness is corrected for the detected data and the surface texture is calculated. When the detecting switch 62 confirms that the skid 14 is attached, the surface roughness is calculated without correcting straightness of the detected data. Accordingly, a calculation designation error accompanying the attachment and detachment of the skid 14 can be avoided.

Since the limit switch is used for the detecting switch 62, the structure of the detecting switch 62 can be simplified.

In the present embodiment, since the surface texture measuring instrument comprises the detector 10 having the stylus 13 and the skid 14 at the distal end thereof, the drive unit 20 for moving the detector 10 along the measurement surface, the pre-loading means 41 and 42 for pre-loading the detector 10 to press the skid 14 against the measurement surface, and the pre-loading force controller 47 for adjusting the pre-loading force of the pre-loading means 41 and 42, the pressing force of the skid 14 can be easily controlled by operating the pre-loading force controller 47.

Therefore, when the skid is exchanged into a different type, the pressing force of the skid 14 can be controlled in accordance with the type of the exchanged skid.

Further, since the surface texture measuring instrument of the present embodiment has the restriction means 50 for restricting the movement of the detector 10 in the pre-loading direction when the predetermined pre-loading force is applied to the pre-loading force controller 47, the skid measurement and the skidless measurement can be easily switched by operating the pre-loading force controller 47.

Further, since the pre-loading means comprises the holding pre-loading means 41 for mainly holding the detector 10 and the pressing pre-loading means 42 for pressing the detector 10 against the measurement surface, the pre-loading force of the detector 10 can be easily adjusted by securing a minimum pre-loading force by the holding pre-loading means 41 and by adjusting the pre-loading force by the pressing pre-loading means 42.

Further, since the holding pre-loading means 41 and the pressing pre-loading means 42 comprises the first and the second leaf-springs, the structure of the pre-loading means itself can be simplified. Since the leaf-spring is popularly used for measuring instruments and can be obtained relatively inexpensively, production cost of the measuring instrument can be reduced.

Further, since the pre-loading force controller is composed of an adjustment screw for moving the second end of the second leaf-spring 42 toward and away from the second end of the first leaf-spring 41, the pre-loading force of the detector 10 can be easily controlled by adjusting the screwing amount of the adjustment screw 47.

Further, since the restriction means 50 is a stopper for restricting the movement of the detector 10 in the pre-loading direction when the pre-loading force of the detector 10 is increased by screwing the adjustment screw, the structure itself can be simplified.

Since the surface texture measuring instrument includes the auxiliary pre-loading means 43 for pre-loading the distal end of the detector 10 toward the measurement surface, the pre-loading force applied to the detector 10 can be minutely adjusted by the auxiliary pre-loading means 43 in addition to the pre-loading means 41 and 42.

Since the auxiliary pre-loading means 43 is a helical spring provided between the detector and the drive unit, the structure of the device can be simplified.

Further, since the helical spring 43 has an end in contact with the spring force adjustment screw 48, the pre-loading force of the helical spring 43 can be minutely adjusted by changing the screwing amount of the spring force adjustment screw 48.

Further, since the slider 23 holding the detector 10 is advanced and retracted along the slider guide 22 and the slider guide 22 has the first and the second reference surfaces in contact with the slider 23, higher rigidity can be maintained as compared to forming the slider guide with a circular rod member.

Accordingly, linearity of the moving direction of the detector 10 advanced and retracted along the slider guide 22 can be secured.

Further, since the slider 23 is constantly biased toward the reference surface of the slider guide 22 by the positioning leaf-springs 32 and 36, the position of the slider 23 can be maintained constant even when a clearance is formed between the slider 23 and the slider guide 22.

Accordingly, the change in orientation of the slider 23, i.e. the detector 10, by the clearance of the slide portion can be prevented.

Since the slider guide 22 and the slider 23 are formed in approximately a C-shaped cross section, high rigidity can be attained.

Since the slider guide 22 is integrally fixed to the casing 21, the rigidity of the casing 21 can be strengthened by the slider guide 22.

Incidentally, the scope of the present invention is not restricted to the above embodiment, but includes modification and improvements as long as an object of the present invention can be attained.

For instance, though the detecting switch 62 is composed of a limit switch in the above embodiment, the detecting switch may be a switch using piezoelectric device, etc.

Further, though the two types of balance weights 63 and 64 are provided, only one of the balance weights 63 and 64 may be used. Alternatively, a third balance weight having the same structure as the second balance weight may be used.

The balance weight 63 may be composed of a nut member screwed to a male screw projecting from the arm member 52 in the longitudinal direction.

Though the pre-loading means of the above embodiment includes the holding pre-loading means 41 for mainly holding the detector 10 and the pressing pre-loading means 42 for pressing the detector 10 toward the measurement surface, only a single pre-loading means may be provided in the present invention.

When the pre-loading means is composed of the holding pre-loading means 41 and the pressing pre-loading means 42, the pre-loading means may not be composed of the leaf-spring. For instance, a helical spring may be used instead of the leaf-spring.

Further, though the adjustment screw 47 is used as the pre-loading means controller, the motor and wheel gear mechanism may be used for automatically adjusting pre-loading force of the pre-loading means.

Further, the auxiliary pre-loading means 43 may not be provided. However, even when the auxiliary pre-loading means 43 is provided, the leaf-spring may be used instead of the helical spring.

Further, in the present embodiment, the slider 23 holding the detector 10 may be advanced and retracted by a slider guide composed of a circular rod member.

Further, the movement of the detector 10 may be restricted by pre-loading the detector 10 in negative pre-loading direction and by pressing the connector attachment 40 to the drive unit attachment 44.

Further, the pre-loading controller may mutually connect or fit the connector attachment 40 to the drive unit attachment 44.

What is claimed is:

1. A detector for a surface texture measuring instrument, comprising:

an arm member detachably attached with a stylus arm having a stylus at a distal end thereof;

a casing rotatably holding the are member;

pivots projecting from both sides of a rotation center of the arm member;

a first ball bearing engaged to a distal end of one end of one of the pivots, the first ball bearing being fixed to the casing; and a second ball bearing engaged to a distal end of the other one of the pivots and attached to the casing through a leaf-spring, the leaf-spring pre-loading the second ball bearing to the pivots and having one end fixed to the casing and the other end fixed to the second ball bearing.

* * * * *